(12) United States Patent
Li et al.

(10) Patent No.: US 11,919,574 B2
(45) Date of Patent: Mar. 5, 2024

(54) APPARATUSES AND METHODS INVOLVING THERMALLY TUNED COMPOSITE MATERIAL

(71) Applicant: The Board of Trustees of the Leland Stanford Junior University, Stanford, CA (US)

(72) Inventors: Wei Li, Palo Alto, CA (US); Yu Shi, Redwood City, CA (US); Shanhui Fan, Stanford, CA (US); Zhen Chen, Redwood City, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 742 days.

(21) Appl. No.: 17/043,102

(22) PCT Filed: Mar. 29, 2019

(86) PCT No.: PCT/US2019/025005
§ 371 (c)(1),
(2) Date: Sep. 29, 2020

(87) PCT Pub. No.: WO2019/191690
PCT Pub. Date: Oct. 3, 2019

(65) Prior Publication Data
US 2021/0024143 A1 Jan. 28, 2021

Related U.S. Application Data

(60) Provisional application No. 62/650,107, filed on Mar. 29, 2018.

(51) Int. Cl.
*B62D 29/00* (2006.01)
*B05D 5/06* (2006.01)
(Continued)

(52) U.S. Cl.
CPC .............. *B62D 29/00* (2013.01); *B05D 5/066* (2013.01); *F24F 5/0089* (2013.01); *F28F 13/18* (2013.01);
(Continued)

(58) Field of Classification Search
CPC ..... G02F 1/0147; F28F 2245/06; F28F 13/18; F24F 5/0089; B05D 5/066; B62D 29/00;
(Continued)

(56) References Cited

U.S. PATENT DOCUMENTS 4,363,703 A 12/1982 ElDifrawi et al.
6,034,813 A * 3/2000 Woodard .......... B32B 17/10018
359/590

(Continued)

FOREIGN PATENT DOCUMENTS

WO 2017151514 A1 9/2017

OTHER PUBLICATIONS

Li, W. et al. A Comprehensive Photonic Approach for Solar Cell Cooling. ACS Photonics 4, 774-782 (2017).
(Continued)

*Primary Examiner* — Justin M Jonaitis
(74) *Attorney, Agent, or Firm* — Crawford Maunu PLLC

(57) ABSTRACT

An apparatus includes a substrate, at least one type of tuning material, and a composite material. The substrate has an interface surface or material that manifests, in response to light in a color spectrum, a particular color and a first thermal load. The particular color is associated with the first thermal load. The at least one type of tuning material manifests, in response to light in the color spectrum, the particular color and a second thermal load. The particular color is associated with the second thermal load. The first thermal load is different from the second thermal load. The composite material includes the interface surface or material
(Continued)

and the at least one type of tuning material. The composite material manifests, in response to light in the color spectrum, the particular color and a tuned thermal load which is different than the first thermal load and the second thermal load.

20 Claims, 10 Drawing Sheets

(51) Int. Cl.
    *F24F 5/00*     (2006.01)
    *F28F 13/18*     (2006.01)
    *G02F 1/01*     (2006.01)

(52) U.S. Cl.
    CPC ........ *G02F 1/0147* (2013.01); *F28F 2245/06* (2013.01)

(58) Field of Classification Search
    CPC ........ G02B 5/282; G02B 5/281; B32B 7/027; B32B 7/023
    See application file for complete search history.

(56) References Cited

U.S. PATENT DOCUMENTS

| | | | |
|---|---|---|---|
| 7,270,295 | B2 | 9/2007 | Bennett |
| 7,503,971 | B2 | 3/2009 | Wojtysiak |
| 7,637,457 | B2 | 12/2009 | Bennett |
| 7,810,325 | B2 | 10/2010 | Bennett |
| 8,132,412 | B2 | 3/2012 | Bennett |
| 9,908,790 | B2 | 3/2018 | Maiti et al. |
| 10,955,587 | B2 * | 3/2021 | Bee ................. B32B 27/34 |
| 2003/0035972 | A1 * | 2/2003 | Hanson ............. B32B 7/023 428/912.2 |
| 2005/0064094 | A1 | 3/2005 | Wojtysiak et al. |
| 2005/0116336 | A1 * | 6/2005 | Chopra ............. H01L 23/373 257/E23.11 |
| 2005/0242232 | A1 | 11/2005 | Bennett |
| 2008/0121755 | A1 | 5/2008 | Bennett |
| 2009/0313994 | A1 | 12/2009 | Bennett |
| 2010/0162702 | A1 | 7/2010 | Bennett |
| 2010/0252647 | A1 | 10/2010 | Ace |
| 2010/0326424 | A1 | 12/2010 | Bennett |
| 2015/0107983 | A1 | 4/2015 | Maiti |
| 2015/0131146 | A1 | 5/2015 | Fan et al. |
| 2015/0275077 | A1 | 10/2015 | Berdahl |
| 2015/0289452 | A1 | 10/2015 | Axley et al. |
| 2015/0338175 | A1 | 11/2015 | Raman et al. |
| 2016/0268464 | A1 | 9/2016 | Fan et al. |
| 2017/0248381 | A1 | 8/2017 | Yang et al. |
| 2017/0297750 | A1 | 10/2017 | Liu et al. |
| 2017/0342278 | A1 | 11/2017 | Zalich et al. |
| 2018/0023866 | A1 | 1/2018 | Chen et al. |
| 2019/0086164 | A1 * | 3/2019 | Yang ................ F28D 20/00 |
| 2020/0132900 | A1 * | 4/2020 | Furuta ............. B42D 25/328 |

OTHER PUBLICATIONS

Li, W. et al. Photonic Thermal Management of Coloured Objects. Nature Communications 9, 1-8 (Oct. 12, 2018). Content submitted as Appendix A of the priority U.S. Appl. No. 62/650,107.

Fan, S. Thermal Photonics and Energy Applications. Joule 1, 264-273 (2017).
Greffet, J. J. et al. Coherent emission of light by thermal sources. Nature 416, 61-64 (2002).
Cao, L. et al. Engineering light absorption in semiconductor nanowire devices. Nat. Mater. 8, 643-647 (2009).
Aydin, K., Ferry, V. E., Briggs, R. M. & Atwater, H. A. Broadband polarization-independent resonant light absorption using ultrathin plasmonic super absorbers. Nat. Commun. 2, 517 (2011).
Liu, X. et al. Taming the Blackbody with Infrared Metamaterials as Selective Thermal Emitters. Phys. Rev. Lett. 107, 45901 (2011).
Yeng, Y. X. et al. Enabling high-temperature nanophotonics for energy applications. Proc. Natl. Acad. Sci. USA. 109, 2280-5 (2012).
Raman, A. P., Anoma, M. A., Zhu, L., Rephaeli, E. & Fan, S. Passive radiative cooling below ambient air temperature under direct sunlight. Nature 515, 540-544 (2014).
Zhou, L. et al. 3D self-assembly of aluminium nanoparticles for plasmon-enhanced solar desalination. Nat. Photonics 10, 393-398 (2016).
Ilic, O. et al. Tailoring high-temperature radiation and the resurrection of the incandescent source. Nat. Nanotechnol. 11, 320-324 (2016).
Zhai, Y. et al. Scalable-manufactured randomized glass-polymer hybrid metamaterial for daytime radiative cooling. Science 355, 1062-1066 (2017).
Chen, Z., Zhu, L., Raman, A. & Fan, S. Radiative cooling to deep sub-freezing temperatures through a 24-h day-night cycle. Nat. Commun. 7, 13729 (2016).
Thomas, N. H., Chen, Z., Fan, S. & Minnich, A. J. Semiconductor-based Multilayer Selective Solar Absorber for Unconcentrated Solar Thermal Energy Conversion. Sci. Rep. 7, 5362 (2017).
Stockman, A. & Sharpe, L. T. The spectral sensitivities of the middle- and long-wavelength-sensitive cones derived from measurements in observers of known genotype. Vision Res. 40, 1711-1737 (2000).
De Zoysa, M. et al. Conversion of broadband to narrowband thermal emission through energy recycling. Nat. Photonics 6, 535-539 (2012). Abstract Only.
Li, P. et al. Large-Scale Nanophotonic Solar Selective Absorbers for High-Efficiency Solar Thermal Energy Conversion. Adv. Mater. 27, 4585-4591 (2015). Abstract Only.
Zhu, L., Raman, A. & Fan, S. Color-preserving daytime radiative cooling. Appl. Phys. Lett. 103, 223902 (2013). Abstract Only.
Catalanotti, S. et al. The radiative cooling of selective surfaces. Sol. Energy 17, 83-89 (1975). Abstract Only.
Granqvist, C. G. & Hjortsberg, A. Radiative cooling to low temperatures: General considerations and application to selectively emitting SiO films. J. Appl. Phys. 52, 4205 (1981). Abstract Only.
Gentle, A. R. & Smith, G. B. Radiative Heat Pumping from the Earth Using Surface Phonon Resonant Nanoparticles. Nano Lett. 10, 373-379 (2010). Abstract Only.
Fairman, H. S., Brill, M. H. & Hemmendinger, H. How the CIE 1931 Color-Matching Functions Were Derived from Wright-Guild Data. Col Res Appl 22, 11-23 (1997). Abstract Only.
Shi, Y. et al. Optimization of Multilayer Optical Films with a Memetic Algorithm and Mixed Integer Programming. ACS Photonics (2017). Abstract Only.
USPTO. International Search Report and Written Opinion dated Jun. 24, 2019, for parent PCT Application No. PCT/US2019/025005, 7 pages.

\* cited by examiner

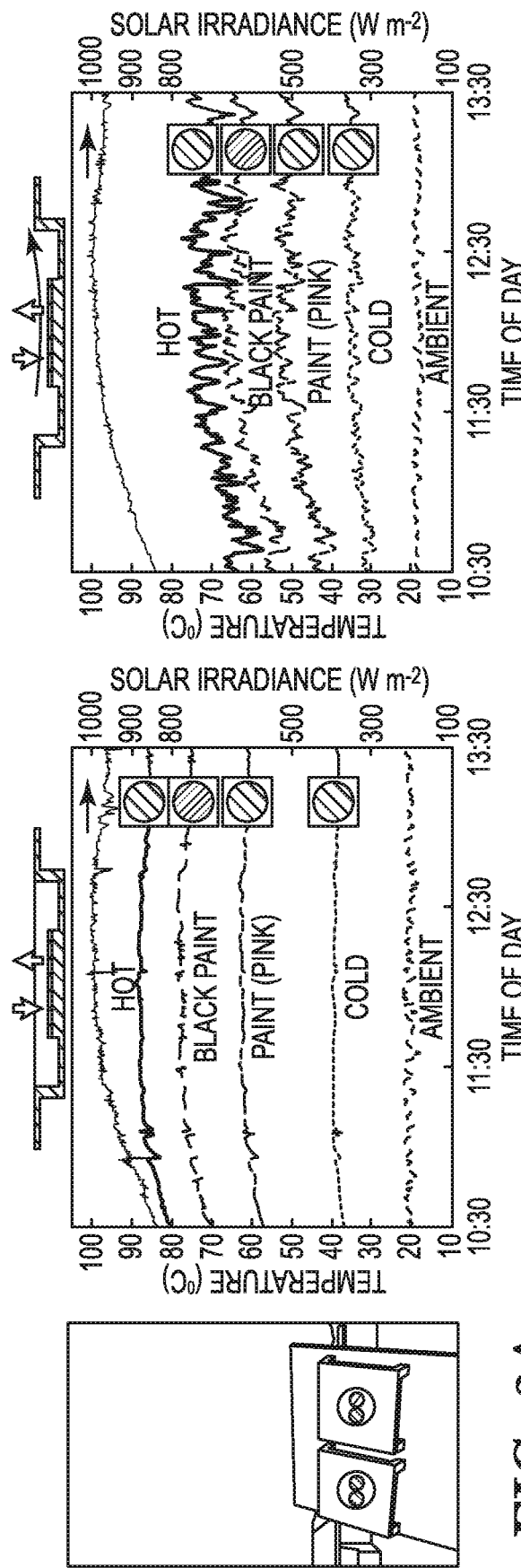

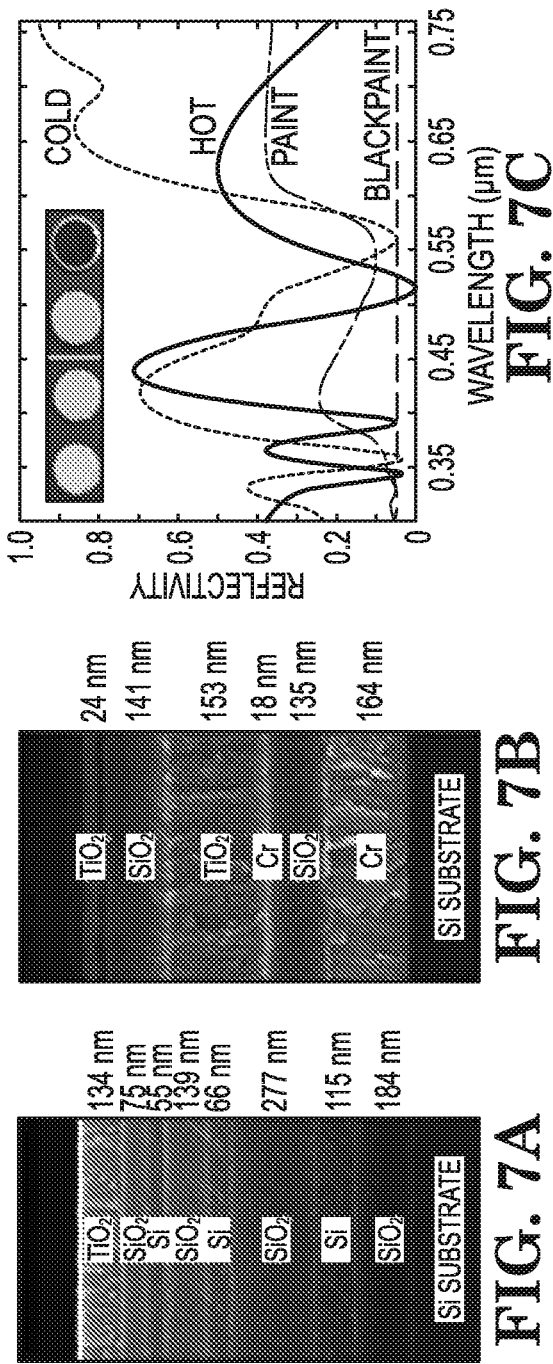
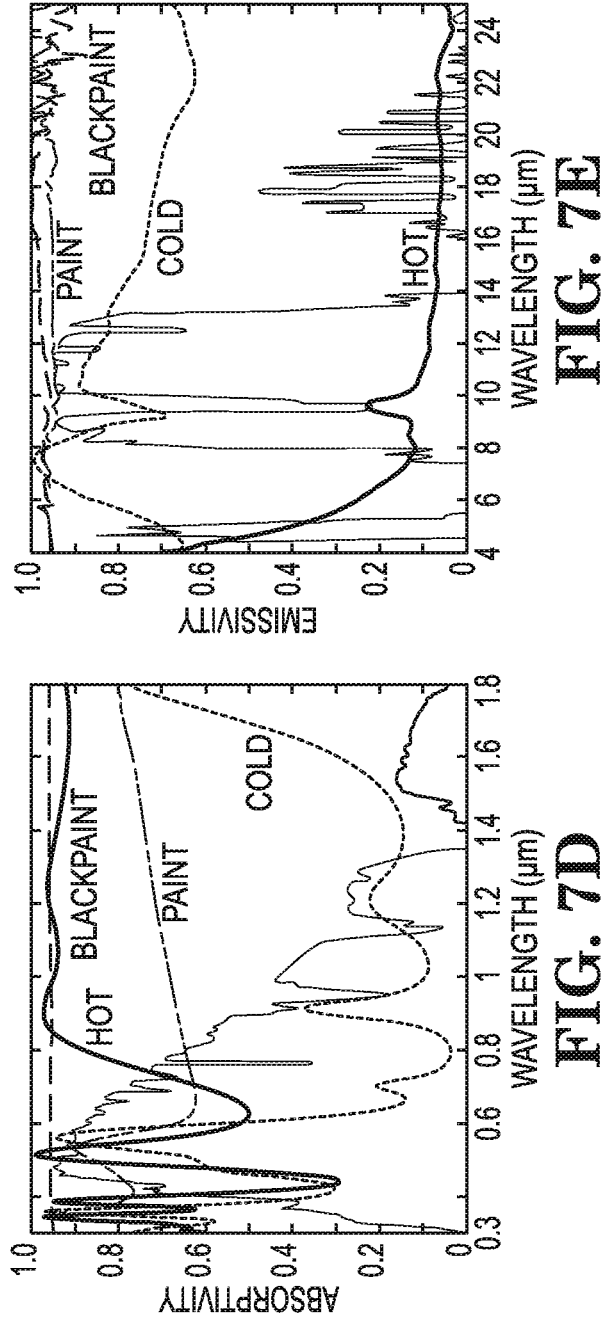

APPARATUSES AND METHODS INVOLVING THERMALLY TUNED COMPOSITE MATERIAL

FEDERALLY-SPONSORED RESEARCH AND DEVELOPMENT

This invention was made with Government support under contract DE-SC0001293 awarded by the Department of Energy and under contract N00014-17-1-3030 awarded by the Office of Naval Research. The Government has certain rights in the invention.

OVERVIEW

The color of structures that are exposed to sunlight or used outdoors, such as automobiles, buildings, and clothing, for example, can be chosen for functional or aesthetic reasons. In many instances, the particular chosen color may be associated with a radiative thermal load. Controlling the radiative thermal load of the structure can be beneficial for a variety of purposes, such as maximizing or minimizing the radiative thermal load for heating or cooling purposes.

The above issues as well as others have presented challenges related to use of color in structures exposed to sunlight or used outdoors for a variety of applications.

SUMMARY

Aspects of various embodiments are directed to apparatuses and/or methods involving thermally tuned composite material. In the following discussion, various implementations and applications are disclosed to provide an understanding of the instant disclosure by way of non-limiting example embodiments.

Various aspects are directed to and/or involving a composite material formed of two materials that respectively have different thermal loads. The composite material manifests, in response to light in a color spectrum, a particular color and a tuned thermal load that is different than the thermal loads of the two materials that form the composite material.

A number of aspects are directed to an apparatus that includes a substrate, at least one type of tuning material, and a composite material. The substrate has an interface surface or material that manifests, in response to light in a color spectrum, a particular color and a first thermal load. The particular color is associated with the first thermal load for the interface surface of material. The at least one type of tuning material manifests, in response to light in the color spectrum, the particular color and a second thermal load. The particular color is similarly associated with the second thermal load for said at least one type of tuning material. Additionally, the first thermal load is different from the second thermal load. The composite material includes the interface surface or material of the substrate and the at least one type of tuning material. The composite material manifests, in response to light in the color spectrum, the particular color and a tuned thermal load which is different than both the first thermal load and the second thermal load.

The composite material, when exposed to light in the color spectrum, retains the particular color while changing temperature in response to the light according to or to reflect the tuned thermal load. In specific aspects, the composite material is part of apparel, part of an automobile, and/or part of a building that, when exposed to light in the color spectrum, manifests the particular color and the tuned thermal load. In other related and specific aspects, the composite material is included in means for indicating movement directions (e.g., signage, road tape, a sign, and walkway paint) that, when exposed to light in the color spectrum, manifests the particular color. In more specific and related aspects, the composite material includes at least two from the group consisting of: chemicals to manifest the particular color, metal oxides particles to manifest the particular color, and dyes of selected concentration to manifest the particular color.

Other aspects are directed to methods of forming the above-described apparatus. An example method includes providing at least two materials and providing a composite, which includes the at least two materials, to manifest a tuned thermal load in response to light in a color spectrum. The at least two materials are characterized as manifesting, in response to light in the color spectrum, a particular color that is common to each of said two materials. The said at least two materials are further characterized by first and second thermal loads. Further, each of the tuned thermal load, the first thermal load, and the second thermal load are different from one another. In various aspects, the method further includes providing a substrate and coating the substrate with the composite as a cover layer above the substrate. The substrate can be part of, in specific aspects, another structure, such as an automobile, a building, signage, and clothing.

In a number of aspects, the at least two materials are used in a set of at least two layers that are secured to one another to manifest the particular color. In other aspects, the at least two materials are integrated, or at least partially integrated, together to form the composite. In further and related aspects, providing the at least two materials includes providing a plurality of the at least two materials in an alternating stack. For example, providing the at least two materials can include providing a plurality of the at least two materials. The at least two materials can refer to or include different chemicals, and the method further includes combining different chemical components as pigments for the composite.

In other aspects and/or in addition, at least one of said at least two materials refers to or includes metal oxide particles that manifest the particular color. In further aspects and/or in addition, the at least two materials refers to or includes dyes of selected concentration that manifest the particular color and/or dielectric particles that manifest the particular color. In more specific aspects, at least one of said at least two materials refers to or includes dielectric and conductive particles, organic molecules, or a synthetic material, composed of polymer or plastic, that manifest the particular color. In specific aspects, a plurality of the at least two materials refer to or include two or more of the following: different chemicals to manifest the particular color, metal oxide particles to manifest the particular color, and dyes of selected concentration to manifest the particular color.

BRIEF DESCRIPTION OF THE FIGURES

Various example embodiments may be more completely understood in consideration of the following detailed description in connection with the accompanying drawings, in which:

FIGS. 3A-3C illustrate example temperature performance of two colored objects of the same color, in accordance with various embodiments;

FIGS. 7A-7E illustrate example cross-sectional scanning electron microscope (SEM) images and reflectivity, absorptivity and emissivity spectra of photonic structures.

Figure 1:
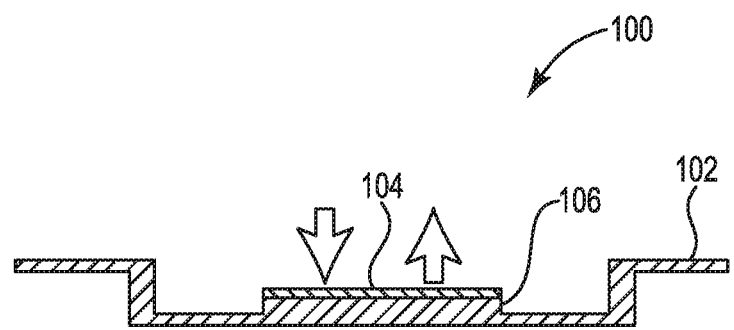
FIG. 1 illustrates an example apparatus, in accordance with various embodiments.

While various embodiments discussed herein are amenable to modifications and alternative forms, aspects thereof have been shown by way of example in the drawings will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods of use, methods of making, or materials, involving thermally tuned composite material. In specific embodiments, the composite includes at least two colored materials which are thermally tuned such that the composite provides a different thermal load than each of the colored materials. While the present invention is not necessarily limited to such aspects, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Radiative thermal load of materials, such as materials forming structures, can be impacted by the color of the material. Controlling the radiative thermal load of structures, in particular for outdoor structures that are exposed to the elements, may be useful for energy efficiency and other purposes. The radiative thermal load of a structure results from the heating of the structure by external radiation such as the sun, as well as the cooling of such structure due to heat dissipation through thermal radiation. Heating and cooling of structures, such as buildings and automobiles, may account for a significant percentage of energy use. As a specific example, it is estimated that heating and cooling accounts for forty-eight percent of energy use in homes. As another specific example, it is estimated that in automobiles, air-conditioning reduces the fuel economy of the automobile by twenty percent. Various example embodiments in accordance with the present disclosure are directed to composite materials which have a tuned radiative thermal load. The composite materials can be used in a variety of structures, such as homes and automobiles, in order to reduce energy consumption.

Additionally, controlling the radiative thermal load of humans may be useful for health purposes. For example, there can be health threats to humans because of outdoor heat and cold stress. Various example embodiments in accordance with the present disclosure are directed to composite materials which tune the radiative thermal load of apparel, when incorporated into or made part of the apparel, which may be worn by humans during their occupation, sport, or military work, for examples.

Particular example embodiments are directed to apparatuses configured and arranged to exhibit a particular color and a particular set of thermal-response properties and/or to provide a particular range of thermal-management properties, and methods of manufacturing the same. Embodiments include apparatuses that exhibit a color and a different set of thermal response properties of that color, which provides a range of thermal-management that is different than the color would otherwise provide. Other embodiments are directed to the various materials and/or methods of forming material of a particular color that exhibits a tuned radiative thermal load. Additional and related embodiments are directed toward methods and apparatuses that are formed from the material, in which the material is designed to exhibit the particular color having different sets of thermal responses using a variety of techniques. The material can be used in or form part of, for example, a motor vehicle, a building, and/or clothing, among other implementations. Examples of methods used to make apparatuses that exhibit a particular color but exhibit a thermal response that is outside of a range of thermal responses of the color, include using chemical components in pigments, different dyes, and metal and dielectric nanoparticles.

Various embodiments are directed to addressing challenges relating to the above aspects, and others, as may benefit a variety of materials of a particular color that exhibits different radiative thermal loads. Somewhat surprisingly, the radiative thermal load can be controllably set to a tuned radiative thermal load without affecting the color of the material. In some specific implementations, the radiative thermal load can be maximized or minimized for heating or cooling purposes.

Various embodiments are directed to apparatuses that include a substrate, at least one type of tuning material, and a composite material. The substrate has an interface surface or material that manifests, in response to light in a color spectrum, a particular color and a first thermal load. The particular color is associated with the first thermal load for the interface surface of material. The at least one type of tuning material manifests, in response to light in the color spectrum, the particular color and a second thermal load. The particular color is similarly associated with the second thermal load for said at least one type of tuning material. Additionally, the first thermal load is different from the second thermal load. The composite material includes the interface surface or material of the substrate and the at least one type of tuning material. The composite material manifests, in response to light in the color spectrum, the particular color and a tuned thermal load which is different than both the first thermal load and the second thermal load. The composite material can include the at one type of tuning material and the interface surface or material arranged in a set of at least two layers that are secured to one another to manifest the particular color. In other embodiments, the at least one type of tuning material and the interface surface or material are at least partially integrated together to form the composite.

The composite material, when exposed to light in the color spectrum, retains the particular color while changing temperature in response to the light according to or to reflect the tuned thermal load. In specific embodiments, the composite material is part of apparel, part of an automobile, and/or part of a building that when exposed to light in the color spectrum, manifests the particular color and the tuned thermal load. In other related and specific embodiments, the composite material is included in means for indicating movement directions (e.g., signage, road tape, a sign, and walkway paint) that, when exposed to light in the color spectrum, manifests the particular color. In more specific and related embodiments, the composite material includes at least two from the group consisting of: chemicals to manifest the particular color, metal oxides particles to manifest the particular color, and dyes of selected concentration to manifest the particular color.

In a number of embodiments, material of a particular color can be designed to have a particular thermal response, solar absorption spectrum, and/or thermal emissivity spectra. For example, the material of the particular color may exhibit a tuned radiative thermal load by performing at least one of: mixing chemical components in pigments at particular concentrations, mixing dyes at particular concentrations, and mixing particles at particular concentrations to design and/or provide the material of the particular color that exhibits a particular solar absorption property in the visible spectrum range. Alternatively and/or in addition, the material of the particular color may exhibit the tuned radiative thermal load by performing at least one of: use of particles of particular sizes and use of metal and/or dielectric structures of particular size and geometry to design and/or provide the material of the particular color that exhibits an infrared solar absorption spectrum from 0.76 to 4 micrometer ($\mu m$) and exhibits the tuned radiative thermal load. In further embodiments, and in some instances, in combination with one or more of the above, the material of the particular color exhibits the tuned radiative thermal load in the wavelength range from 4 to 25 $\mu m$ by performing at least one of: use of polymers and plastics, use of dielectric materials, use of metal and/or conductive oxides.

It accordance with various embodiments, it has been discovered that different colors have a surprisingly large tunable range of radiative thermal load. As an example, a plurality of colors (e.g., all) can have a range that exceeds 680 $Wm^{-2}$ and can be as high as 866 $Wm^{-2}$. The range may result from the physiological effect of metamerism and the physical effect of infrared solar absorption and radiative cooling. In a specific example embodiment, two photonic structures of the same pink color can have temperatures that differ by 47.6 degrees Celsius (C) in direct sunlight. Both structures can be over 20 degrees C. cooler or hotter than commercial paint in a comparable pink color.

Somewhat surprisingly, various embodiments are directed to material that does not exhibit a direct association between the color of the material and the resulting thermal load. The material, of a particular color, may have a tunable range of thermal load using a variety of techniques. Different objects having the same color may be designed and/or manufactured to exhibit different thermal responses. Colors may have a significant tunable range of radiative thermal load, which may be used for thermal management of buildings, vehicles and clothing, for example, in outdoor conditions without affecting visual perception of the colors.

The above-described apparatuses and composite materials can be used in a variety of methods and applications, as further described herein.

Turning now to the figures, FIG. 1 illustrates an example apparatus 100, in accordance with various embodiments. The apparatus 100 can form part of a structure, such as an article of apparel, an automobile, a building, and a means for indicating movement direction (e.g., signage, road tape, sign, and walkway paint) for example, or any other suitable object. The apparatus 100 includes a substrate 102, at least one type of tuning material 104, and a composite material 104, 106.

The substrate 102 has an interface surface or material 106 to manifest in response to light in a color spectrum, a particular color and a first thermal load. The particular color of the substrate 102 may be associated with the first thermal load for the interface surface or material 106, and may be any color. In various embodiments, the interface surface or material 106 is integrated with the substrate 102 (e.g., fused together) and in other related embodiments, the interface surface or material 106 is a layered with the substrate 102.

The at least one type of tuning material 104 manifest in response to light in the color spectrum, having the particular color and a second thermal load. The particular color may be associated with the second thermal load for the at least one type of tuning material 104, wherein the first thermal load is different from the second thermal load.

As illustrated by FIG. 1, the composite material 104, 106, includes the interface surface or material 106 of the substrate 102 and the at least one type of tuning material 104. The two (or more) materials forming the composite material 104, 106 can be layered or fused together, such that the materials are integrated or at least partially integrated together. For example, the interface surface or material 106 and the least one type of tuning material 104 can be integrated together to form a single layer. Similarly, as described above, the interface surface or material 106 can be layered or fused together with the substrate 102. The composite material 104, 106 manifests, in response to light in the color spectrum, the particular color and a tuned thermal load which is different than both the first thermal load and the second thermal load. The composite material 104, 106 may, when exposed to light in the color spectrum, retain the particular color while changing temperature in response to the light according to or to reflect the tuned thermal load. As described above, the composite material 104, 106 may be part of, for example, a structure, such as apparel, an automobile or a building, for example, that, when exposed to light in the color spectrum, manifests the particular color and the tuned thermal load. In such embodiments, the apparatus 100 includes or is the structure and the substrate 102 forms part of the structure.

In a number of embodiments, the composite material 104, 106, may include a single layer of each of the interface surface or material 106 and the least one type of tuning material 104, as illustrated in FIG. 1. However, embodiments are not so limited and the composite material may include a single layer of the interface surface or material 106 and the least one type of tuning material 104 integrated together or any number of alternating, or other arrangements of, layers of interface material 106 and tuning material 104.

For example, FIGS. 7A-7B illustrate two examples of SEM cross-sectional images of composite structures consisting of 7 alternating layers of silicon (Si) and silicon dioxide ($SiO_2$) and a layer of titanium dioxide ($TiO_2$) as the top layer (e.g., FIG. 7A), and three layers of metal-insulator-metal (MIM) on the bottom and three dielectric layers on the top (e.g., FIG. 7B). The layered configurations shown in FIGS. 7A-7B are example embodiments, and other suitable configurations are contemplated.

Various embodiments are directed to methods for providing materials that each exhibit a particular color but exhibit a different set of thermal-response properties, which can provide an expanded range of thermal-management properties. An example method includes providing at least two materials, the at least two materials being characterized as manifesting, in response to light in a color spectrum, a particular color that is common to each of said at least two materials, and the said at least two materials being characterized by first and second thermal loads. The method further includes providing a composite that includes the at least two materials, the composite being characterized as manifesting a tuned thermal load, in response to light in a color spectrum, wherein each of the tuned thermal load, the first thermal load and the second thermal load are different from each of the other two thermal loads.

The methods can be based on combining different mechanisms that can exhibit the same color but having different thermal responses, such as: metamerism induced solar absorption difference from 0.3 to 0.76 μm, infrared solar absorption difference from 0.76 to 4 μm, radiative cooling difference from 4 to 25 μm.

Various techniques can be used to tune the thermal response of material of a particular color. In some specific embodiments, example techniques that can be used to design visible absorption spectrum that exhibit a desired color but a set of different thermal responses include use of chemical components in pigments. Chemical components in pigments, such as metal oxide particles or organic molecules, can have a different set of narrowband absorption at different visible wavelength range. By mixing different chemical components in pigments with correctly designed concentrations, a desired color with a different set of solar absorption properties in the visible spectrum range can be constructed. Another technique can include use of different dyes that exhibit a set of different narrow band absorption spectrum in visible spectrum. By mixing different dyes with different concentrations, a desired color with a different set of solar absorption properties in the visible spectrum range can be constructed. In various embodiments, metal and dielectric nanoparticles can be used, which can be designed to have narrow band absorption in the visible wavelength spectrum. The absorption wavelength can be tuned by materials and particle size and geometry. By mixing the different particles with different concentrations, a desired color with a different set of solar absorption properties in the visible spectrum range can be constructed.

A number of techniques can be used to design infrared solar absorption spectrum from 0.76 to 4 μm that does not affect color, but that can exhibit a different set of thermal responses for the same color. Such techniques can include uses of dielectric particles. Dielectric particles, such as titanium dioxide, zinc oxide, and silicon particles, can have strong reflection at certain wavelengths, depending on the particle size. By correctly designing the particles sizes and mixing, high reflection in the near infrared solar spectrum from 0.76 to 4 μm can be achieved to increase the thermal load. Another technique can include metal and dielectric structures, which can have strong absorption in the near infrared spectrum, with correctly designed size and geometry. By correctly designing the structure sizes and geometry, high absorption in the near infrared solar spectrum from 0.76 to 4 μm can be achieved to reduce the thermal load. A number of techniques can be used to design thermal emissivity spectrum from 4 to 25 μm that does not affect color, but can exhibit a different set of thermal responses. Example techniques can include use of polymers and plastics, such as polydimethylsiloxane, polymethylpentene, polyvinyl fluoride and polystyrene. The polymers and/or plastics can have high thermal emissivity in the wavelength range from 4 to 25 μm. These materials can be added to enhance the thermal emissivity to reduce the thermal load. Another technique includes the use of dielectric materials, including silica, hafnia, silicon nitride, and silicon carbide. The dielectric materials can have high emissivity in the wavelength range from 4 to 25 μm. These materials can be added to enhance the thermal emissivity to reduce the thermal load. Various embodiments include the use of metals and conductive oxides that have low emissivity in the wavelength range from 4 to 25 μm, which can be added to suppress the thermal emissivity to increase the thermal load.

Various embodiments include combining one or more of the above-mentioned techniques to design materials that exhibit a certain color and that also exhibit a different set of thermal-response properties, from 0.3 to 25 μm wavelength range. Such example methods can be implemented in pigment or dye as a colorant material. And, in various embodiments, the materials can be applied to coatings on a variety of outdoor applications for thermal management purposes, including automotive vehicles, exterior building and roof coating, and clothing. Example methods and/or apparatuses are applicable to any color.

Industry colorants can include pigments (e.g., insoluble compounds), and dyes (e.g., soluble colored organic compounds). The pigments be used in paints, ceramics, and plastics, among other materials. The dyes may be used in textiles, among other material. For both of the colorants, the color components can have selective narrow band absorption in certain wavelength region. Various embodiments are directed to mixing components with well-designed concentrations to construct a colorant with a specific color, but with very different spectral and thermal absorption properties, and which is applicable for applications such as vehicles, buildings, and clothing. Additionally, various material of desired colors can be designed with desired thermal properties using correctly designed nano-photonic structures (e.g., including but not limited to structures including optoelectronics, microelectronics, implemented as part of integrated circuit chips, and/or materials in various forms whether crystallized, having multiple layers, porous material, etc.).

Various materials, elements, dyes, chemicals, particles or pigments, for example, may be used alone or in combination in the composite material in order to tune the thermal response of a substrate or material of a particular color. Some examples of tuning materials or components that may be included, while using any of a variety of techniques, include organic chemical components in pigments. Some examples of organic chemical components include, but are not limited to, chlorophyll a, chlorophyll b, phycoerythrin, and phycocyanin. Inorganic pigment nanoparticles may alternatively, or additionally, be used as tuning materials or components, with some examples including, but not being limited to, prussian blue, iron oxide, and silicon. Dyes may be used alternatively, or additionally, as tuning materials of components in the composite material, which include, but are not limited to, cyanine dyes (Cy) such as Cy3, Cy3.5, Cy5, Cy5.5, Cy7, and Cy7.5. Some examples of metal particles that may be used alternatively, or additionally, in the composite material as tuning materials or components include, but are not limited to, gold (Au), silver (Ag), aluminum (Al), and copper (Cu). Some examples of dielectric particles that may be used alternatively, or additionally, in the composite material as tuning materials or components include, but are not limited to, Si, germanium (Ge), $SiO_2$, aluminum oxide ($Al_2O_3$), zinc oxide (ZnO), $TiO_2$, and iron oxide ($Fe_2O_3$). Some examples of polymers that may be used alternatively, or additionally in the composite material as tuning materials or components include, but are not limited to, polyethylene, polystyrene, poly(methyl methacrylate), polymethylpentene, and poly(vinylidene fluoride-co-hexafluoropropene).

The concentrations of materials or components that may be used to tune the underlying substrate or material to which the composite material is applied, or into which it is incorporated, are dependent upon the specific color of the substrate and/or the particular color desired. Suitable concentrations of components are chosen based on the particular color and substrate.

The following is an example calculation of the net radiative thermal load of the object:

$$P_{net} = P_{sun}^{visible} + P_{sun}^{infrared} - P_{cooling} \quad (1)$$

where $$P_{sun}^{infrared} = \int_{0.3\,um}^{0.76\,um} d\lambda \cdot I_{AM1.5}(\lambda) \cdot \varepsilon(\lambda) \quad (2)$$

is the absorbed power density from the visible and ultra violet part of the solar spectrum; $I_{AM1.5}(\lambda)$ is the AM1.5 spectrum, $\varepsilon(\lambda)$ is the spectral absorptivity of the outdoor object;

$$P_{sun}^{infrared} = \int_{0.76\,um}^{4\,um} d\lambda \cdot I_{AM1.5}(\lambda) \cdot \varepsilon(\lambda) \quad (3)$$

is the absorbed power density from the infrared part of the solar spectrum; and $$P_{cooling} = P_{rad} - P_{atm} \quad (4)$$

is the net radiative cooling power in the absence of sunlight. $P_{rad}$ is the total thermal radiation power by the object and may be calculated as $$P_{rad} = \int d\Omega \cdot \cos\theta \int_0^\infty d\lambda \cdot I_{BB}(T,\lambda) \varepsilon(\lambda,\Omega) \quad (5)$$

where $\int d\Omega = \int_0^{\pi/2} d\theta \sin\theta \int_0^{2\pi} d\phi$ is the angular integral over the hemisphere. $I_{BB}(T,\lambda) = (2hc^2/\lambda^5)/[e^{hc/\lambda K_B T} - 1]$ is the spectral radiance of a blackbody at temperature T, where h is the Planck's constant, c is the velocity of light, $K_B$ is the Boltzmann constant. $P_{atm}$ is the absorbed thermal emission power from the atmosphere at ambient temperature $T_{amb}$ and may be calculated as $$P_{atm} = \int d\Omega \cdot \cos\theta \int_0^\infty d\lambda \cdot I_{BB}(T_{amb},\lambda) \varepsilon(\lambda,\Omega) \varepsilon_{atm}(\lambda,\Omega) \quad (6)$$

where $\varepsilon_{atm}(\lambda,\Omega) = 1 - t(\lambda)^{1/\cos\theta}$ is the angle-dependent emissivity of atmosphere and $t(\lambda)$ is the atmosphere's transmittance in the zenith direction.

From Eq. (1), objects that have the same color response in an outdoor environment can have drastically different thermal loads, because each of the terms in Eq. (1) can have a substantial range of variability (See, e.g., FIG. 2A). The variability of each of the parts of Eq. (1) is described below:

(1) $P_{sun}^{infrared}$: The infrared portion of the solar spectrum may not contribute to the color property of object. There is, nevertheless, a significant part of the solar power in the wavelength range from 0.76 μm to 4 μm. For AM 1.5 spectrum, $P_{sun}^{infrared}$ can vary from 0 $Wm^{-2}$ to 453 $Wm^{-2}$, depending on the solar absorptivity of the object in this wavelength range.

(2) $P_{cooling}$: In the infrared wavelength range between 4 μm and 25 μm, there is a lack of solar energy. On the other hand, an outdoor object facing the sky can emit heat out to the outer space by thermal radiation through the atmosphere transparency window between 8 μm and 13 μm. Such a process, known as radiative cooling, does not affect the color but contributes to a negative thermal load, or radiative cooling power $P_{cooling}$. At 298 degrees Kelvin, assuming an atmospheric transmission spectrum of a clear day, and depending on the object's infrared emissivity spectrum, $P_{cooling}$ can vary between 0 $Wm^{-2}$ and 130 $Wm^{-2}$.

(3) $P_{sun}^{infrared}$: In the visible and ultra violet part of solar spectrum from 0.3 μm to 0.76 μm, the spectral absorption and reflection properties of the object dictate both the color and $P_{sun}^{infrared}$. However, the human eye contains three color receptors with sensitivity span in the visible spectrum.

Figure 2A:
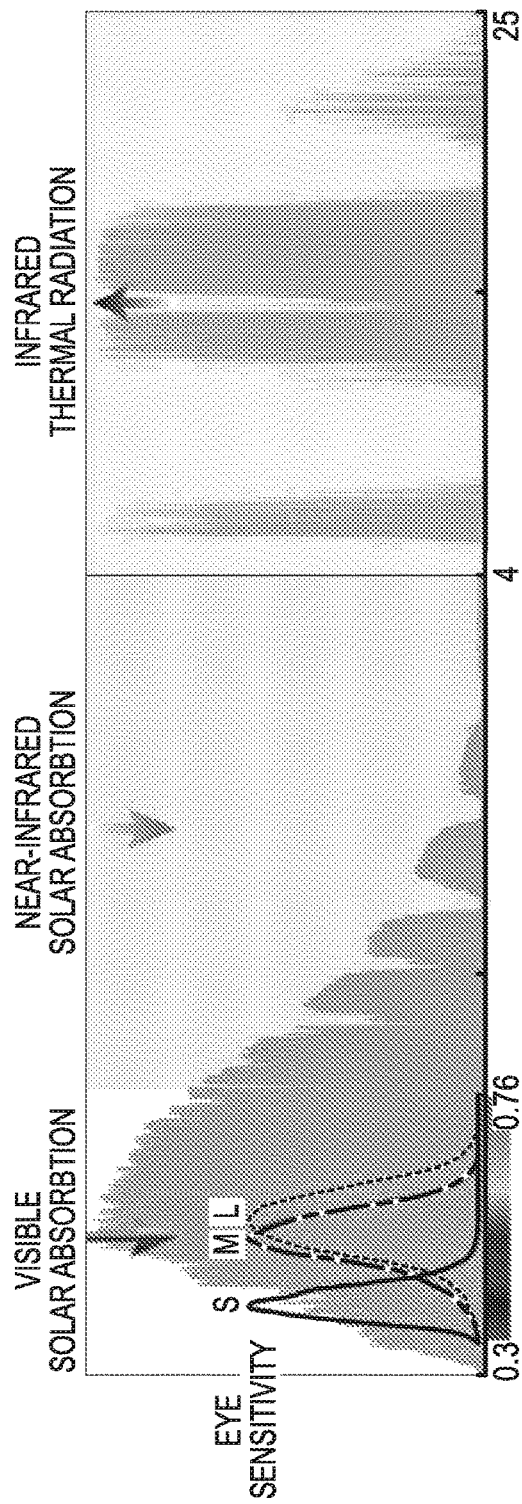
FIGS. 2A-2B illustrate example mechanisms for performing photonic management of a colored material, in accordance with various embodiments.

FIG. 2A illustrates three example mechanisms that can be used for photonic management of a colored material and/or object, which includes visual solar absorption, near-infrared solar absorption and infrared thermal emission. Such mechanisms can be used individually and/or in various combinations for color-preserving photonic thermal management in the visible, near infrared and thermal wavelength range. FIG. 2A further illustrates the human eye sensitivity spectra of three receptors with short "S", middle "M", and long "L" sensitivities, as well as the AM 1.5G solar spectrum and atmospheric transmittance for reference. For color vision, all spectra are reduced to three tristimulus values. As a result, light with different spectral power distributions may produce an equivalent receptor response and color sensation. This physiological effect is known as metamerism. Based on the metamerism effect, two surfaces that have very different solar absorption in the visible wavelength range, and very different $P_{sun}^{infrared}$ may appear indistinguishable in color.

Figure 2B:
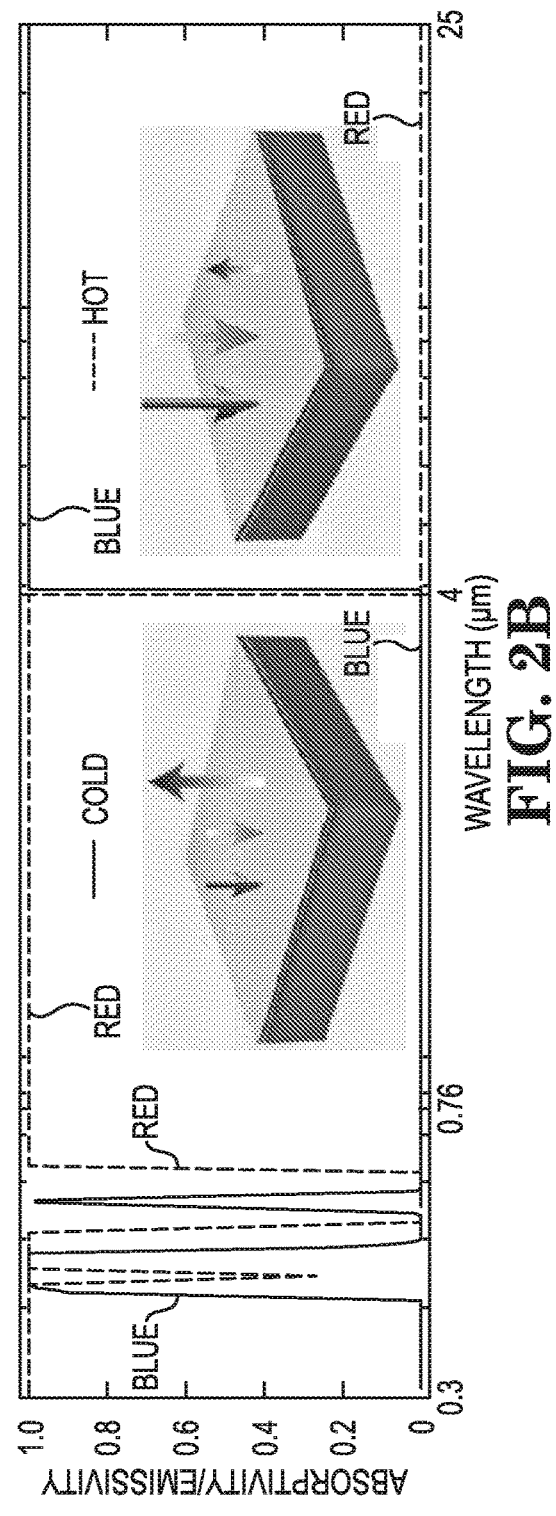

FIG. 2B illustrates example absorptivity/emissivity spectra of two surfaces with the same gold color that exhibit different thermal properties. One of the surfaces can be referred to as a "cold surface" (e.g., the left inset of FIG. 2B), which exhibits high reflection and low absorption in the visible and near infrared wavelength range, as well as high thermal emission in the wavelength range. The other of the surfaces can be referred as a "hot surface" (e.g., the right inset of FIG. 2B), and which exhibits a low reflection and high absorption in the visible and near infrared wavelength range, as well as low thermal emission in the thermal wavelength range (relative to the cold surface). As an example, in FIG. 2B, both absorptivity spectra produce a gold color as shown in the insets. Their visible solar absorption power $P_{sun}^{infrared}$ at 125.5 $Wm^{-2}$ and 376.5 $Wm^{-2}$ respectively, differs by about a factor of 3.

Combining all three terms in Eq. (1) as discussed above, one can have different objects with the same color response having a different net radiative thermal load by tuning the thermal load of materials. The different spectra for the same color parameters can be considered and the tunable range of thermal loads can be computed using Eq. (1) for all colors. Every color can be described numerically by three parameters labeled L, a and b, where L represents its lightness, and the combination of a and b determines its chromaticity, which includes both the saturation $C_{ab} = \sqrt{a^2 + b^2}$ and the hue $h_{ab} = \arctan(b/a)$ of the color.

Various embodiments, as described above, are directed to composite material and/or methods of forming a composite that exhibits a particular color and a tuned thermal load to light in the color spectrum. The tuned thermal load is not directly associated with the color of the materials forming the composite and/or the resulting color of the composite. The range of radiative thermal load for particular colors can be tuned, which may be used for thermal management of buildings, vehicles and clothing without affecting visual perception of the colors.

More Detailed/Experimental Embodiments

Embodiments are directed to an apparatus and methods involving composite materials which are used to controllably set a radiative thermal load of an apparatus to a tuned radiative thermal load without affecting the color of the material of the apparatus. For any given color, there is a tunable range of its radiative thermal load, due to the physical effects of infrared solar absorption and radiative cooling, as well as the physiological effect of metamerism, since color arises from human perception of the visible spectrum. Various experimental embodiments are directed to tuning the thermal load of materials and observing the resulting thermal properties exhibited.

FIGS. 3A-3C illustrate example temperature performance of two colored objects of the same color, in accordance with various embodiments. More specifically, FIG. 3A illustrates a photograph of an example temperature measurement apparatus on a test rooftop. FIG. 3B illustrates resulting rooftop measurements of different objects in the same color that exhibit different thermal properties, as well as comparison to standard paint in a similar color, black paint and ambient air temperature. FIG. 3C illustrates example measurements of the same objects as FIG. 3B with free air flow convection used to mimic typical outdoor conditions.

The two photonic structures and reference paint samples are tested on a flat building roof, as shown by FIG. 3A. The example experimental apparatus for temperature measurements consist of an aluminized Mylar-coated wooden frame. A clear acrylic box with the top side open is joined and sealed to the underside of the wooden frame's top surface. A polystyrene pedestal covered by aluminized Mylar is glued on the acrylic box. In various experimental embodiments, as illustrated by FIG. 3B, the top aperture of the wooden frame is covered with infrared transparent low-density polyethylene film to reduce the air convection effect. In other related experiment embodiments, as illustrated by FIG. 3C, the top aperture of the wooden frame is left open to mimic the typical outdoor conditions in the presence of convective airflow cooling. The back surfaces of the samples are instrumented with an adhesive resistance temperature detector sensor with ±0.15 degrees C. accuracy mounted on the center of the structures, connected to a data logger). On the days that testing occurs, the sun's peak elevation is around 35 degrees above the horizon, whereas the apparatus containing the samples is placed on a platform tilted 55 degrees toward the south. Thus, at maximum solar irradiance sunlight is near-normally incident on the samples. During the measurement, a pyranometer and a data logger rated to a directional error of ±20 $Wm^{-2}$ are used to record the solar irradiance incident on the samples. The pyranometer is placed on the same tilted platform as the apparatuses. An air-temperature resistance temperature detector probe with ±0.15 degrees C. accuracy is used to measure the ambient air temperature. The probe is mounted behind the platform, with free airflow and without access to direct sunlight irradiance.

The samples are exposed to sunlight and sky by placing them on a building roof, as illustrated by FIG. 3A, during daylight hours on a clear day. In various experimental embodiments, the apparatus consists of two identical chambers placed side by side, with the two photonics structures placed in a first chamber and two paint samples placed in a second chamber, see FIG. 3A. Each chamber consists of acrylic walls and polystyrene supporters.

In an example experiment embodiment, to reduce the effect of wind while allowing for high transmittance of both solar and thermal radiation, the opening of the chamber is covered with 12.5-µm-thick polyethylene film. As shown in the temperature data of FIG. 3B, the two photonic structures differ significantly in temperatures. The hot photonic structure reaches over 88 degrees C. at noontime when the solar irradiance is over 900 $Wm^{-2}$ and the average temperature for the entire 3 hours measurement period is 86.5 degrees C. The cold sample constantly stays below 40 degrees C., with an average temperature of 38.9 degrees C. As a result, the two visually similar samples show a drastic difference of 47.6 degrees C. in the average temperatures.

The thermal performance of the two photonic structures are compared against the two paint samples as shown in FIG. 3A. The average temperature of the pink paint sample reaches 61.5 degrees C. As a result, the cold photonic structure shows a temperature that is 22.6 degrees C. colder than the pink paint. The hot photonic structure shows a temperature that is 25 degrees C. hotter than the pink paint. These results indicate that with photonic engineering, one can achieve similar colors as compared to conventional paints, but with drastically different thermal responses that can be utilized for heating and/or cooling applications. Additionally, surprisingly, the hot photonic structure with a pink color can reach 10 degrees C. hotter than the black paint, which is thought to be the hottest under sunlight. Such a counterintuitive result further illustrates the great potential of using photonic structures for thermal management purposes. These experimental results can be accounted for by theoretical modeling that takes into account the spectral response of the samples over solar and thermal wavelengths, the non-radiative heat dissipation, the ambient air temperature, and the solar irradiance incident on the samples.

In other experimental embodiments, to mimic a typical outdoor condition with substantial convection heat dissipation induced by strong wind flow, temperatures of all samples are characterized with the same apparatus but the polyethylene cover is removed. As shown in FIG. 3C, all of the four samples show lower temperatures than their covered counterparts in FIG. 3B, as they have access to substantial convective heat dissipation by winds. But even with the presence of substantial air convection, an average temperature difference of 35.4 degrees C. for the entire 3 hours measurement period between the two photonic structures is observed. In addition, comparing with the pink paint sample, the cold photonic structure shows a temperature that is 15.4 degrees C. lower than the pink paint whereas the hot photonic structure shows a temperature that is 20.1 degrees C. hotter. And the hot photonic structure is 7.7 degrees C. hotter than the black paint. The results further demonstrate the efficacy of photonic engineering in thermal management of color objects with desired color perception, in outdoor conditions even with strong convective heat dissipation.

The colors perceived by the human eye result from the interplay between the sensitivity of the eye's three cone cells, the spectral intensity of the light source, and the spectral reflection from the surface. The sensitivities of the three cone cells responsible for color vision at short, middle, and long wavelength, see, e.g., FIG. 2A, are numerically represented by three color matching functions, $\bar{x}(\lambda)$, $\bar{y}(\lambda)$, and $\bar{z}(\lambda)$, which are established from various embodiments on a standard observer by the International Commission on Illumination (CIE). The color matching functions may be thought of as the spectral sensitivity curves of three linear light detectors yielding the CIE tristimulus values X, Y and Z:

$$X = 100 \frac{\int I(\lambda) r(\lambda) \bar{x}(\lambda) d\lambda}{\int I(\lambda) \bar{y}(\lambda) d\lambda} \quad (7)$$

$$Y = 100 \frac{\int I(\lambda) r(\lambda) \bar{y}(\lambda) d\lambda}{\int I(\lambda) \bar{y}(\lambda) d\lambda} \quad (8)$$

$$Z = 100 \frac{\int I(\lambda) r(\lambda) \bar{z}(\lambda) d\lambda}{\int I(\lambda) \bar{y}(\lambda) d\lambda} \quad (9)$$

where $I(\lambda)$ is the spectral power distribution of the illuminant. In a number of embodiments, a standard D65 illumination is used to represent the typical outdoor illumination condition. Assuming the object is opaque, then $r(\lambda)$ can be related with spectral absorptivity $\varepsilon(\lambda)$ by $r(\lambda)=1-\varepsilon(\lambda)$, where $r(\lambda)$ is the spectral reflectivity of the outdoor structure. The calculated CIE tristimulus values X, Y and Z can be used to determine the lightness and chromaticity of the color. The lightness of the color is determined by the parameter Y. And the chromaticity of the color is determined by the normalized parameters:

$$x = \frac{X}{X+Y+Z} \quad (10)$$

$$y = \frac{Y}{X+Y+Z} \quad (11)$$

$$z = \frac{Z}{X+Y+Z} \quad (12)$$

The normalized parameters x and y are used to find the corresponding chromaticity in CIE color space. One can also find the corresponding color in a commonly used and perceptually uniform CIE LAB color space, where L represents the lightness, a represents redness and greenness and b represents yellowness and blueness. The combination of a and b determines color chromaticity, which includes the relative saturation, or chroma $C_{ab} = \sqrt{a^2+b^2}$, as well as the hue of the color $h_{ab}=\arctan(b/a)$. Converting X, Y, Z to L, a, b values can be done using the following equations:

$$L = 116 f(Y/Y_n) - 16 \quad (13)$$

$$a = 500[f(X/X_n) - f(Y/Y_n)] \quad (14)$$

$$b = 200[f(Y/Y_n) - f(Z/Z_n)] \quad (15)$$

where $X_n, Y_n, Z_n$ are the tristimulus value of a reference white object. And:

$$f(s) = s^{1/3} \text{ if } s > (24/116)^3 \quad (16)$$

$$f(s) = (841/108)s + 16/116 \text{ if } s \leq (24/116)^3 \quad (17)$$

The reflection spectra of a given color is calculated with defined $L_0$, $a_0$ and $b_0$ that provide the maximum and minimum net thermal load $P_{net}$ by solving a constrained optimization problem. Given a reflection spectrum $r(\lambda)$, its color can be characterized by its L, a, b parameters as calculated with Eq. (7)-(15). To characterize the thermal variability of a given color, the spectrum with the maximum and minimum thermal load is denoted as $r_{hot}(\lambda)$ and $r_{cold}(\lambda)$, respectively, such that $$r_{hot}(\lambda) = \underset{r(\lambda)}{\mathrm{argmax}} P_{net}(r(\lambda)) \quad (18)$$

$$r_{cold}(\lambda) = \underset{r(\lambda)}{\mathrm{argmin}} P_{net}(r(\lambda)) \quad (19)$$

where $P_{net}$ is defined in Eq. (1). For $r_{hot}(\lambda)$ and $r_{cold}(\Delta)$ to produce the same color, they must satisfy the constraint, such that the color difference with respect to the reference color $L_0$, $a_0$ and $b_0$, defined as $$\Delta E(r(\lambda)) = \sqrt{(L(r(\lambda))-L_0)^2 + (a(r(\lambda))-a_0)^2 + (b(r(\lambda))-b_0)^2} \quad (20)$$

is within 0.1 for both $r_{hot}(\lambda)$ and $r_{cold}(\lambda)$. The result from the optimization in Eq. (18) and (19) gives the reflection spectra that exhibit the same perceived color but have either the maximum or minimum thermal load. This method can be applied to compute the maximum and minimum thermal load associated with any colors, as presented in FIGS. 6A-6C.

Nanoparticles (such as Si, Ge, $SiO_2$, $Al_2O_3$, ZnO, $TiO_2$, $Fe_2O_3$) embedded in a host medium may be used to generate desired absorption/reflection spectrum and therefore desired color. The reflection spectrum can be modeled as uniformly distributed scattering particles embedded in a host medium. The scattering cross sections of particles with different sizes at different wavelengths of a single nanoparticle can be calculated using the Mie theory. (C. F. Bohren, D. R. Huffman, Absorption and Scattering of Light by Small Particles, Wiley, 2008; G. Mie, Annalen der Physik 1908, 330, 377). The optical reflection spectrum $r(\lambda)$ through such medium the nanoparticles can be calculated using the Chandrasekhar radiative transfer theory. (S. Chandrasekhar, Radiative Transfer, Dover Publications, 1960). Then the optimized color and thermal load from such medium with nanoparticles can be calculated based on Eqs. (7)-(20). A variety of reflection/absorption spectrum and colors can be achieved using different particles and size.

Figure 4C:
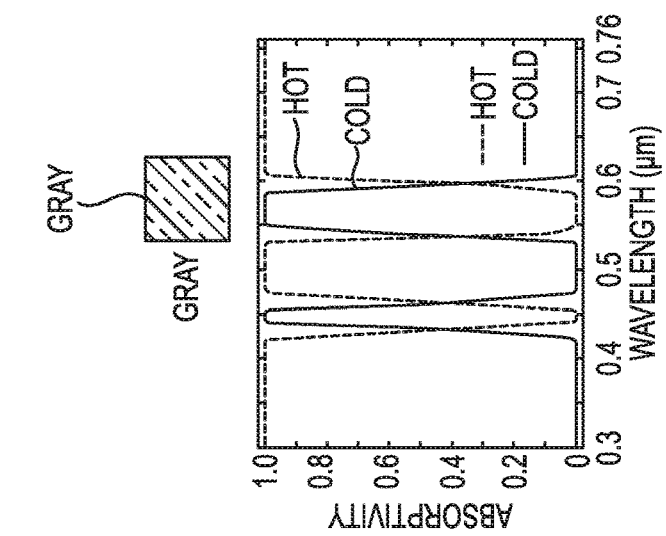
FIGS. 4A-4C illustrate example colors with different thermal properties, in accordance with various embodiments.
Figure 4B:
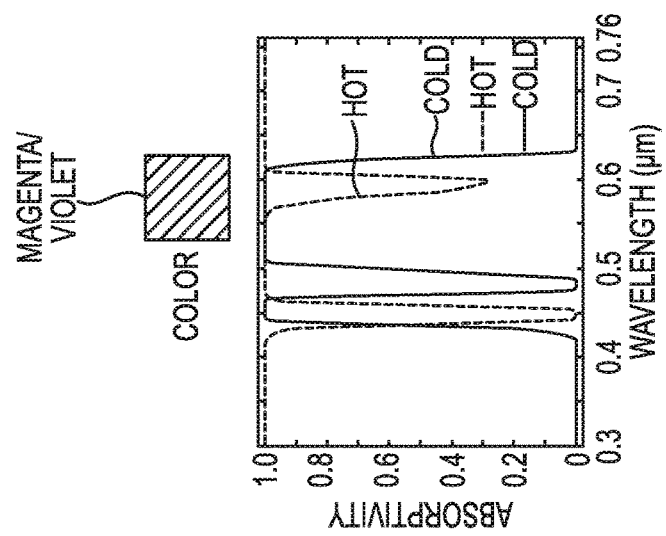
Figure 4A:
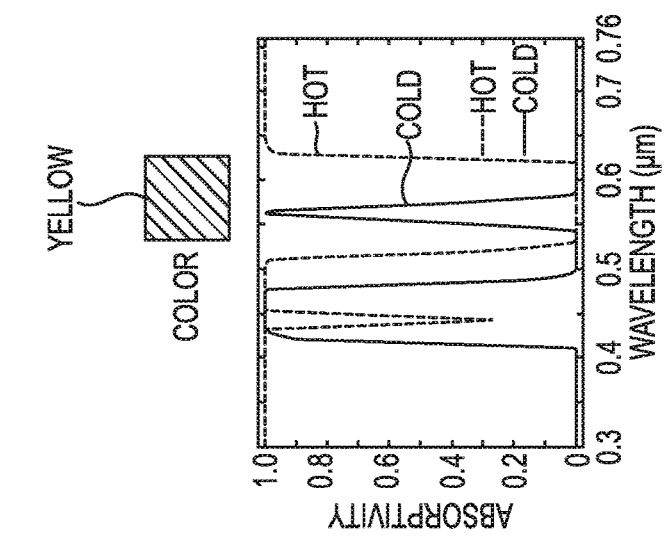

FIGS. 4A-4C illustrates example colors with different thermal properties, in accordance with various embodiments. As illustrated, the colors can include a yellow color as shown in FIG. 4A, a magenta color as shown in FIG. 4B, and a gray color as shown in FIG. 4C. Each of the colors can exhibit different thermal properties that can be tuned from 0.3 to 7.6 μm. The three colors shown in FIGS. 4A-4C are examples, and Eq. (7)-Eq. (20) may be used to similarly calculate results such as those shown in the figures for other colors.

Figure 5A:
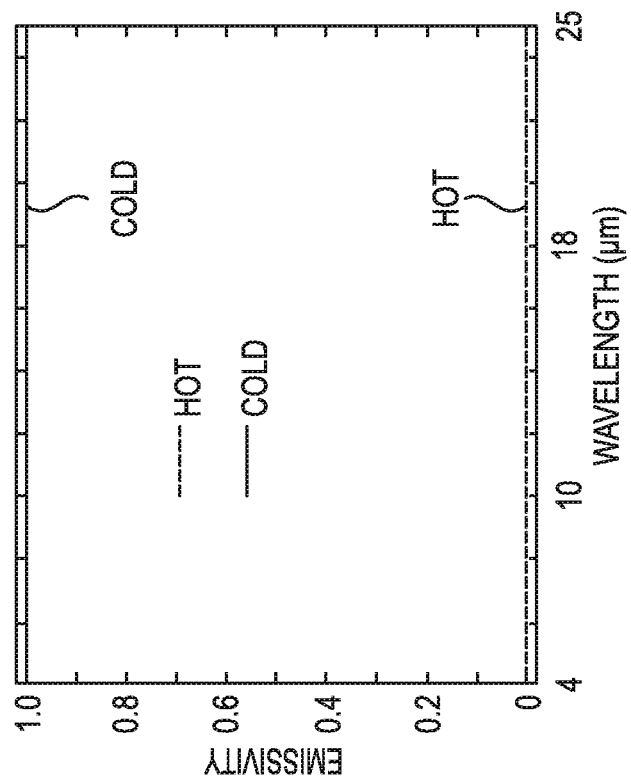
FIGS. 5A-5B illustrate example absorptivity and emissivity spectra, in accordance with various embodiments.
Figure 5B:
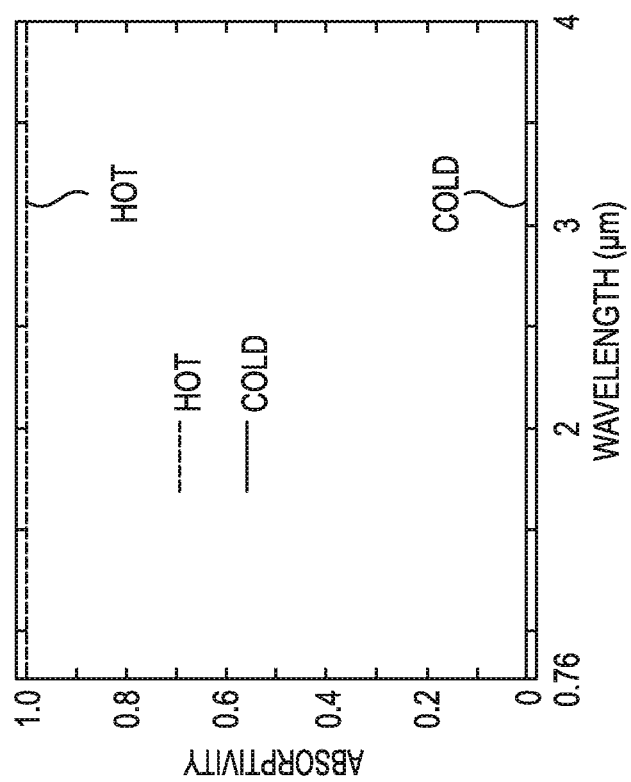

FIGS. 5A-5B illustrates example absorptivity and emissivity spectra, in accordance with various embodiments. More specifically, the absorptivity is illustrated by FIG. 5A of the hot and cold structures and emissivity is illustrated by FIG. 5B of the hot and cold structures, such as the hot and cold structures previously described. For example, FIGS. 5A-5B illustrate the infrared solar spectrum from 0.76 to 4 μm and thermal emission spectrum from 4 to 25 μm, which can include a spectra applicable for any color.

Figure 6A:
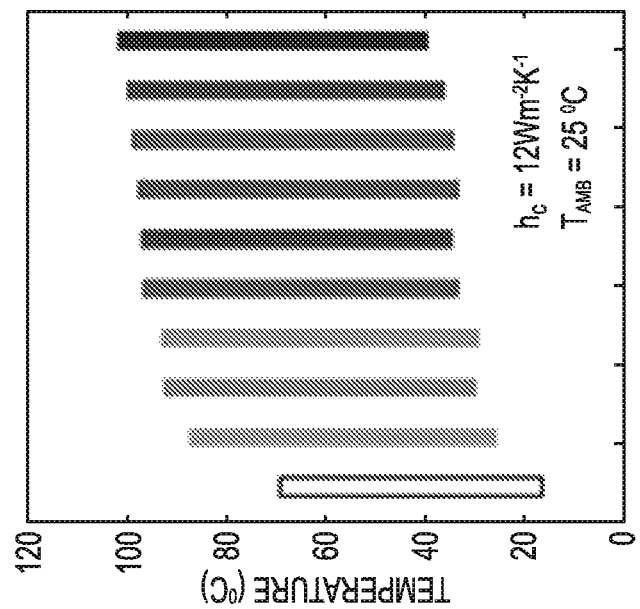
FIGS. 6A-6C illustrate example net radiative thermal loads and tunable ranges of colors, in accordance with various embodiments.
Figure 6B:
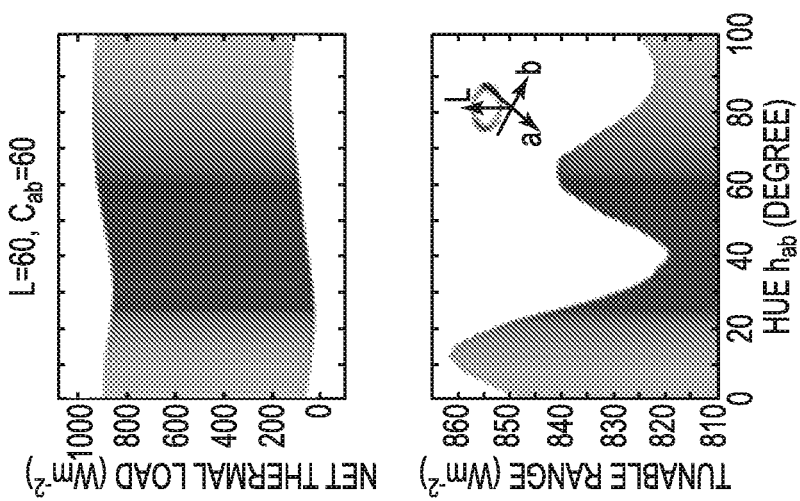
Figure 6C:
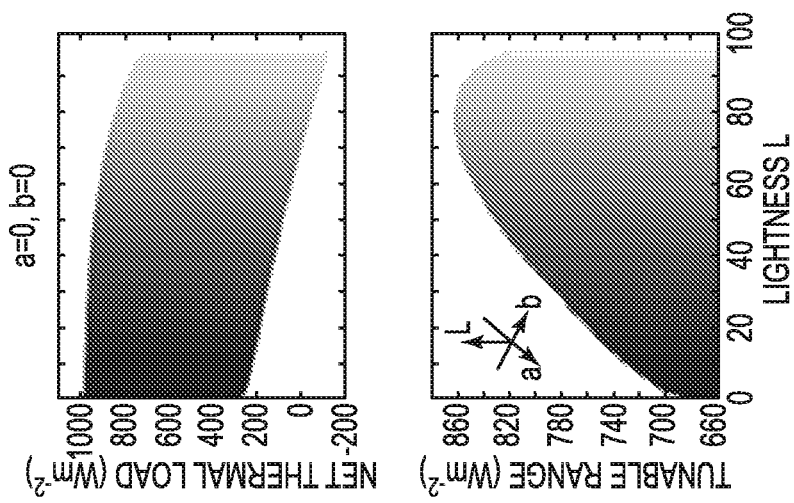

FIGS. 6A-6C illustrate thermal management potential of colors, in accordance with various embodiments. In FIG.

6A, net radiative thermal load (top) and tunable range (bottom) of a color with fixed chromaticity (a=0, b=0), as a function of lightness (L from 0 to 100), is illustrated. The bottom inset of FIG. 6A indicates the location of the computed color in three-dimensional (3D) color space. In FIG. 6B, net radiative thermal load (top) and tunable range (bottom) of color with fixed lightness (L=60) and saturation ($C_{ab}$=60), as a function of hue angle ($h_{ac}$=arctan(b/a) from 360 degrees to 0 degrees) is illustrated. The bottom inset indicates the location of the computer color in 3D color space. In FIG. 6C, a tunable temperature range of commonly used color under a typical non-radiative heat dissipation condition $h_c$=12 $Wm^{-2}K^{-1}$.

To design photonic structures with same color but with different thermal loads, an optimization scheme is used that implements a memetic algorithm to optimize for the photonic structures, taking into account both thermal load and color considerations. The optimization problem is a constrained optimization, such that the resulting reflection spectrum $r(\lambda)$ of the photonic structures preserves the color given by Eq. (20), and that its spectrum reaches maximum or minimum thermal load given by Eq. (18) and (19). For consideration of both performance and fabrication, for each photonic structure, three suitable constituent materials are arranged with desirable optical properties in both solar and thermal wavelength range, as described above. In setting up the memetic algorithm optimization, a population of structures are generated that contain individual structures with randomly varying thicknesses, and each of their reflection spectra $r(\lambda)$ can be computed using a method of impedance at near normal angle of incidence. According to the reflection spectra $r(\lambda)$, a set of standard evolutionary algorithm procedures are iteratively applied to the population, such as crossover, mutation, and reselection, which bypass stagnation in local minima. These operations are combined with intermittent local optimizations performed on selected individuals' layer thicknesses using the quasi-Newton method to speed up the memetic algorithm convergence. At the end of the optimization, the structure that the population converges to contains the optimum thicknesses that result in a reflection spectrum $r(\lambda)$ that reaches maximum/minimum thermal load while preserving the color. This method is applied to design the photonic structures shown in FIGS. 7A-7E, and can be extended to design photonic structures with other specific colors and thermal loads in general.

In specific experimental embodiments, the photonic structures are fabricated by electron beam deposition on 500-µm-thick, 100-mm-diameter, p-doped single-side-polished <100> crystalline silicon wafers, with resistivity 1-10 Ω·cm. To block transmission in the wavelength range below silicon bandgap, the unpolished side of the wafers are coated with silver paste. In the wavelength range of 0.3-1.8 µm, the reflection spectra of the samples are characterized using a spectrophotometer (Agilent Cary 6000i) with an unpolarized light source and a high Lambertian reflectance standard (Labsphere SRS-99-020). A diffuse reflectance accessory (DRA 1800) with a 150-mm-diameter integrating sphere is used to collect both specular and diffuse components of reflection at an 8 degree angle of incidence. In the wavelength range of 4-25 µm, a Fourier transform infrared spectrometer (Thermo Scientific Nicolet 6700) with a diffuse gold integrating sphere (PIKE Technologies) is used to characterize the samples. The absorptivity/emissivity spectra are obtained by subtracting the reflectance from unity. A scanning electron microscope (Nova FEI 450) is used to image the cross sections of the stacks in FIGS. 7A-7B.

FIGS. 7A-7E illustrates experimental realizations of two surfaces with the same color but different radiative thermal loads. FIGS. 7A-7B illustrate cross-sectional SEM images of cold (FIG. 7A) and hot (FIG. 7B) photonic structures with the materials and thickness of each layer. Both of the samples are deposited on 500 µm thick, 100-mm-diameter silicon wafers. FIG. 7C illustrates reflectivity spectra of the cold and hot photonic structures in the visible range demonstrating metamerism. The reflectivity spectra of a commercially available pink paint with similar color and a black paint are also plotted for references. Inset photos show from left to right the hot, cold, pink paint sample and the black paint sample, respectively. FIG. 7D illustrates absorptivity spectra of the cold and hot photonic structures, the pink paint and the black pain samples in the solar wavelength range, with the normalized AM1.5 solar spectrum. FIG. 7E illustrates emissivity spectra of the cold and hot photonic structures, the pink paint and the black paint samples over the infrared wavelength, with atmospheric transmittance plotted as the light blue shaded area for references.

An example of different objects with the same color response having a significantly different net radiative thermal load is in FIG. 7A, which is illustrating grayscale colors that have the same chromaticity (a=0, b=0). The colors vary from black to white as lightness is varied from 0 to 100. For each of the grayscale colors, the minimum and maximum radiative thermal loads differ substantially. At L=78, which corresponds to a light gray color, for example, the thermal loads can vary from −3.7 $Wm^{-2}$ to 862.3 $Wm^{-2}$, corresponding to a tunable range, defined as the difference between the maximum and minimum radiative thermal loads, of 866 $Wm^{-2}$. In general, the grayscale colors exhibit a substantial tunable range varying from 680 to 866 $Wm^{-2}$. In FIG. 7B, a set of colors with the same lightness L=60 and saturation $C_{ab}$=60 is illustrated. As the hue varies from 360 degrees to 0 degrees, the colors change from purple to red. The tunable range of the set of colors varies from 820 to 856 $Wm^2$. The study covers the entire color space. The minimum tunable range occurs for both black (L=0, a=0, b=0) and white (L=100, a=0, b=0) at 680 $Wm^{-2}$. The maximum tunable range occurs for light gray as discussed above at 866 $Wm^2$. And all other colors have a tunable range in between. The results indicate that there is a significant tunable range of at least 680 $Wm^{-2}$ in radiative thermal load for every color. This is a surprisingly large tunable range, which is comparable in magnitude to the total power density of AM1.5 solar spectrum of 1000 $Wm^{-2}$.

Based on the thermal load of colors, the equilibrium temperatures for colored surfaces under a typical outdoor condition is examined, by balancing $P_{net}$ with non-radiative heat loss $P_{cond+conv}$=$h_c$ (T−$T_{amb}$), where $h_c$ is the combined non-radiative heat coefficient taking into account both conduction and convection. FIG. 7C, which shows the equilibrium temperatures of some commonly used colors assuming a typical $h_c$=12 $Wm^{-2} \cdot K^{-1}$, surprisingly illustrates important and counterintuitive aspects regarding how a color of an object relates to its thermal properties. Unlike common perception where a given thermal response is associated with a given color, objects with the same color can have their temperature differ by more than 70 degrees C. in a typical outdoor condition. Moreover, an object with a lighter color can have a higher temperature compared to an object with a darker color. For example, an object with a light blue color can be over 60 degrees C. hotter than an object with a dark blue color. For another example, a white object can be over 30 degrees C. hotter than a black object, which is exactly the opposite of common experience that a black object typically reaches the highest temperature in an outdoor environment under sunlight. These results indicate that depending on the applications, one can construct objects with identical colors in an outdoor environment but with different temperatures.

More specifically, FIGS. 7A and 7B illustrate two photonic structures made of one-dimensional thin film stacks that exhibit the same pink colors (see FIG. 7C, left inset) but differ significantly in their radiative thermal loads. A numerical optimization scheme is developed to design the photonic structures' spectral properties to fulfill both the color and thermal requirements. As shown in the scanning electron microscope cross-section image (FIG. 7A), the cold photonic structure consists of seven alternating layers of silicon (Si) and silicon dioxide ($SiO_2$) and a layer of titanium dioxide ($TiO_2$) as the top layer. The refractive index contrast between Si and $SiO_2$ provides the high reflection in the near infrared region, which may be a useful feature for minimizing solar absorption. The combination of $SiO_2$ and $TiO_2$ with properly designed thickness may be primarily responsible for the large thermal emissivity in the mid infrared wavelength range for radiative cooling purpose, as both materials are emissive in this wavelength range. On the other hand, the hot photonic structure, as shown by FIG. 7B, consists of three layers of MIM on the bottom and three dielectric layers on the top. Chromium (Cr) is used as the metal component in the MIM structure since Cr is highly lossy in the solar wavelength range but strongly reflective in the thermal wavelength range, therefore creating high solar absorption, yet strongly suppressing thermal emissivity. The combination of the material properties and rationally designed layer thickness further allows one to fine tune the visible reflection spectrum to achieve desired color, while having different thermal properties. As discussed above with regards to tuning generally and/or fine tuning as discussed in the immediate preceding context, various approaches may be used including, for example, empirical and/or interpolation, and may also involve developing and drawing from tabled experiments indicating the results of incremental/patterned changes in terms of individual/collective materials, material-specific characteristics (e.g., molecular bonding, geometry at the surface interface, and/or layered surface-interface integration, such as roughness) and the material concentrations.

The spectral properties of the two photonic structures in visible, solar, and mid-infrared thermal wavelengths are compared, see e.g., FIGS. 7C-7E. In the visible spectrum, the two photonic structures (e.g., see FIGS. 7A-7B) exhibit different reflectivity spectra, yet show the same pink color to the human eye (e.g., see FIG. 7C), demonstrating the effect of metamerism. Such a metamerism effect has not previously been demonstrated using nano-photonic structures. In the visible wavelength range, such as the wavelength range of 0.3-0.76 μm in FIG. 7D, the solar absorption of the hot and cold photonic structures are 350 $Wm^{-2}$ and 250 $Wm^{-2}$, respectively. The results demonstrate the benefits of metamerism for thermal management. In the infrared part of solar spectrum (wavelength range of 0.76-1.8 μm in FIG. 7D), which does not contribute to the color response, the solar absorption of the hot and cold structures are 380 $Wm^2$ and 80 $Wm^2$, respectively. For thermal management purposes, it is also beneficial to control infrared solar absorption. In the thermal spectral range (FIG. 7E), the cold photonic structure has a remarkably strong and broadband thermal emissivity, resulting in a $P_{cooling}$ of 99.7 $Wm^{-2}$ at 298 degree Kelvin. By comparison, the hot photonic structure has a strongly suppressed emissivity, with a $P_{cooling}$ of only 14.2 $Wm^2$ at 298 degrees Kelvin. As a result, the total radiative thermal loads of hot and cold photonic structures are 716 $Wm^2$ and 230 $Wm^{-2}$, respectively. All three effects above contribute to the total radiative thermal load difference of 486 $Wm^2$ between the two structures in FIGS. 7A-7B.

As a reference, two commercially available paints coated on identical 100-mm silicon wafers are considered, as shown by FIG. 7C (see, right inset). One paint sample is with similar pink color as the two photonic structures, whereas the other paint is black. Both the pink paint sample and the black paint sample have strong solar absorptivity yet strong thermal emissivity (FIGS. 7C-E). With photonic engineering, the two photonic structures, as shown by FIGS. 7A-7B, exhibit spectral properties that differ significantly from conventional color paints.

The thermal performance of the cold and the hot photonic structures as further illustrated and described in FIGS. 7A-7B, as well as the two paint samples, as illustrated in FIG. 7E, are examined in an outdoor environment.

Figure 8A:
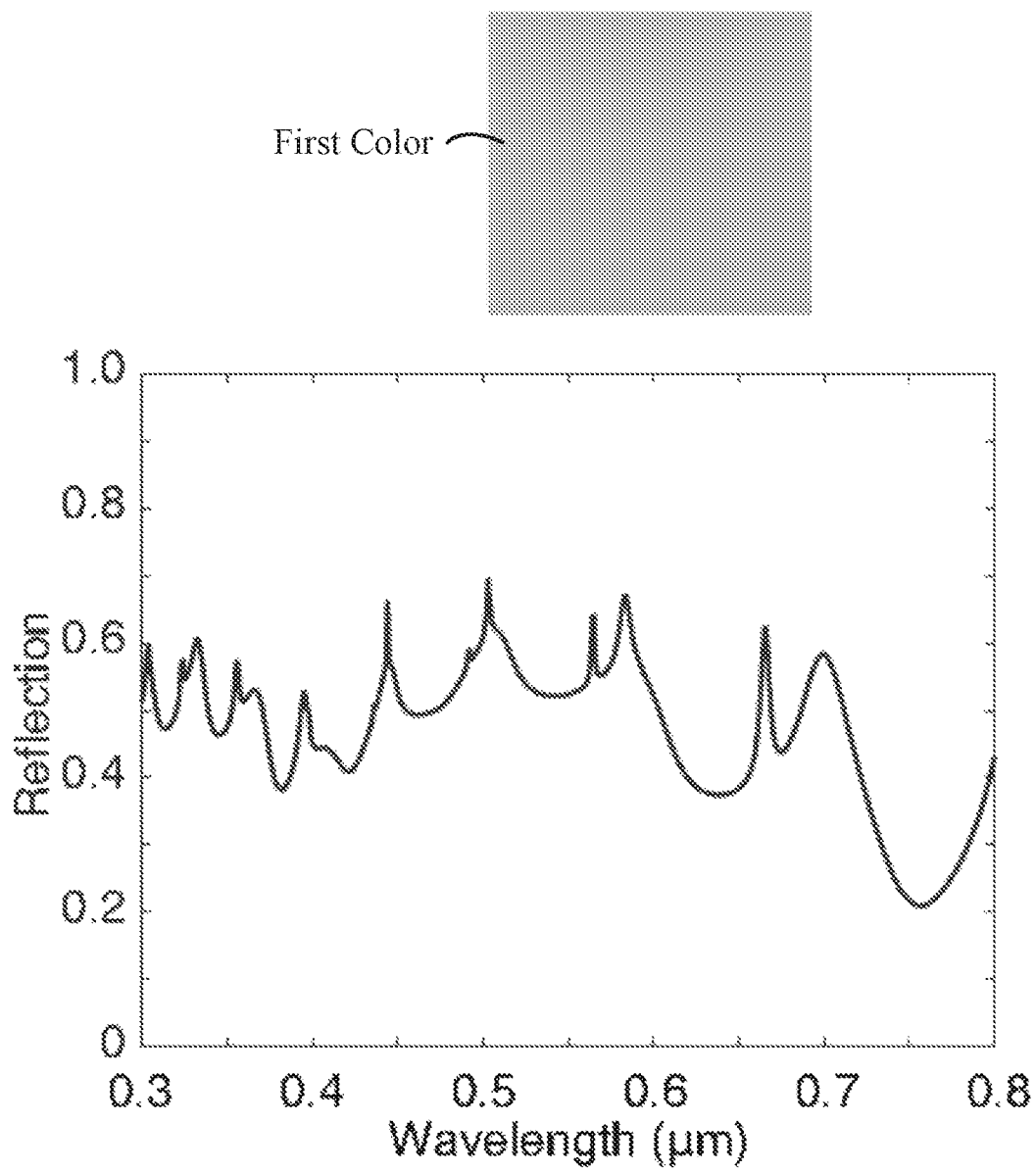
FIGS. 8A-8C illustrate example reflection spectrum for three colors, in accordance with various embodiments.
Figure 8B:
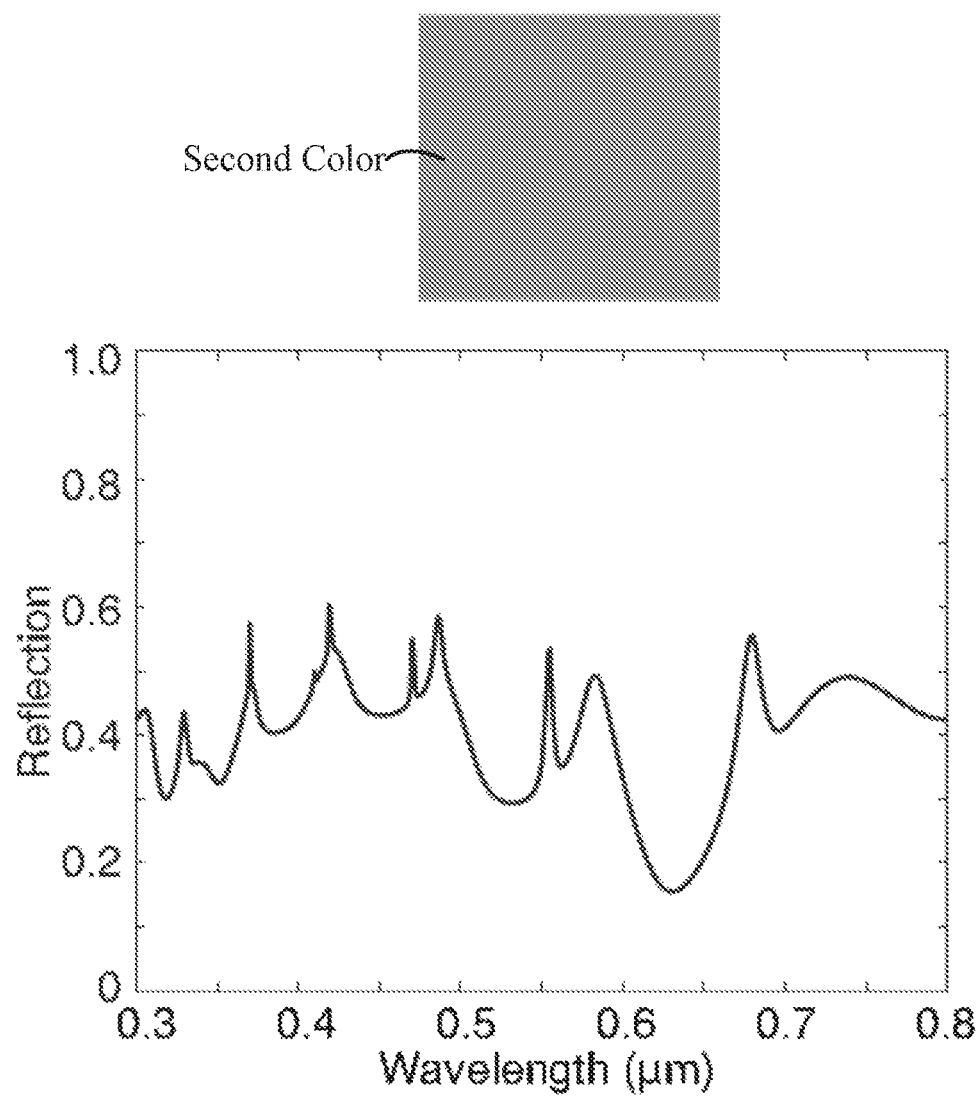
Figure 8C:
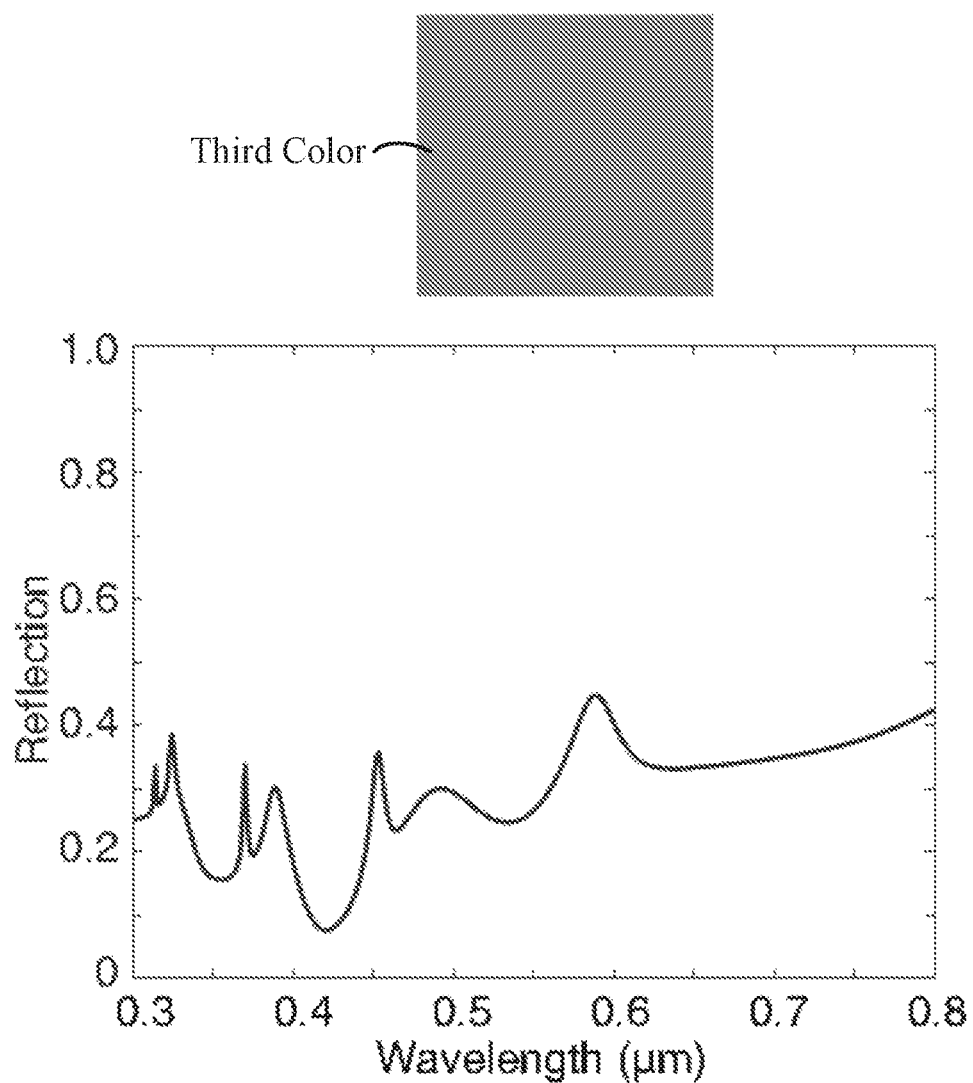

FIGS. 8A-8C illustrate reflection spectrum for three colors, in accordance with various embodiments. In FIGS. 8A-8C, reflection at wavelengths ranging from 0.3 to 0.8 μm, is illustrated, for three different colors (first color, second color, and third color). The color in the examples was produced by nanoparticles being embedded in a medium. In a specific embodiment, the first, second and third colors include different shades of gray. In a specific embodiment, the refractive index of the nanoparticles is 4, and that of the host medium is 1.5, and the total medium thickness is 1 μm. In a specific embodiment, the concentration of particles is 5 particles per um'. In a specific embodiment, the particle size is varied to change the color. For the first color, in FIG. 8A, the particle radius is 180 nm. For the second color, in FIG. 8B, the particle radius is 150 nm. For the third color, in FIG. 8C, the particle radius is 100 nm. The specific sizes, concentrations, materials, etc., in the embodiment illustrated in FIGS. 8A-8C, are examples. In general, a wide range of colors can be achieved by using different particle materials, sizes and concentrations.

Various embodiments are implemented in accordance with the underlying Provisional Application (Ser. No. 62/650,107), entitled "Photonic Thermal Management of Colored Material", filed Mar. 29, 2018, and with three Appendices, to which benefit is claimed and which are fully incorporated herein by reference (to the extent permitted). For instance, embodiments herein and/or in the provisional application (including the appendices therein) may be combined in varying degrees (including wholly). Reference may also be made to the experimental teachings and underlying references provided in the underlying provisional application, including the Appendices that form part of the provisional application. Embodiments discussed in the Appendices are not intended, in any way, to be limiting to the overall technical disclosure, or to any part of the claimed invention unless specifically noted.

While various embodiments discussed herein are amenable to modifications and alternative forms, aspects thereof have been shown by way of example in the drawings and will be described in detail. It should be understood, however, that the intention is not to limit the disclosures to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

Various aspects are shown and/or described in the instant disclosure such as through the use of blocks, modules or circuits (e.g., temperature detectors/controllers) which may be implemented to carry out one or more of the operations and activities involved with the described aspects. In these contexts involving circuitry, it will be appreciated that logic and/or discrete circuitry can be used to carry out one or more of these or related operations/activities. For example, in certain of the above-discussed embodiments, one or more modules are discrete logic circuits or programmable logic circuits configured and arranged for implementing these operations/activities, such as performing methods of detecting temperatures or a temperature range/threshold and/or determining a tunable range of radiative thermal load for material of a particular color. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit).

Based upon the above discussion and illustrations, those skilled in the art will readily recognize that various modifications and changes may be made to the various embodiments without strictly following the exemplary embodiments and applications illustrated and described herein. For example, various imaging processing circuits may be implemented as discussed herein. In addition, the various embodiments described herein may be combined in certain embodiments, and various aspects of individual embodiments may be implemented as separate embodiments. Such modifications do not depart from the true spirit and scope of various aspects of the disclosure, including aspects set forth in the claims.

What is claimed is:

1. An apparatus comprising:
a substrate having an interface surface or material to manifest in response to light in a color spectrum, a particular color and a first thermal load, the particular color being associated with the first thermal load for the interface surface or material;
at least one type of tuning material to manifest in response to light in the color spectrum, the particular color and a second thermal load, the particular color being associated with the second thermal load for said at least one type of tuning material, wherein the first thermal load is different from the second thermal load; and
a composite material, including the interface surface or material of the substrate and the at least one type of tuning material, to manifest in response to light in the color spectrum, the particular color and a tuned thermal load which is different than both the first thermal load and the second thermal load.

2. The apparatus of claim 1, wherein the composite material, when exposed to light in the color spectrum, retains the particular color while changing temperature in response to the light according to or to reflect the tuned thermal load.

3. The apparatus of claim 1, wherein the composite material is part of apparel that, when exposed to light in the color spectrum, manifests the particular color and the tuned thermal load.

4. The apparatus of claim 1, wherein the composite material is part of an automobile that, when exposed to light in the color spectrum, manifests the particular color and the tuned thermal load.

5. The apparatus of claim 1, wherein the composite material is part of a building that, when exposed to light in the color spectrum, manifests the particular color and the tuned thermal load.

6. The apparatus of claim 1, wherein the composite material is included in means for indicating movement direction.

7. The apparatus of claim 1, wherein the composite material includes at least two from the group consisting of: chemicals to manifest the particular color, metal oxide particles to manifest the particular color, and dyes of selected concentration to manifest the particular color.

8. A method comprising:
providing at least two materials, the at least two materials being characterized as manifesting, in response to light in a color spectrum, a particular color that is common to each of said at least two materials, and the said at least two materials being characterized by first and second thermal loads; and
providing a composite that includes the at least two materials, the composite being characterized as manifesting a tuned thermal load, in response to light in a color spectrum, wherein each of the tuned thermal load, the first thermal load and the second thermal load are different from each of the other two thermal loads.

9. The method of claim 8, further including providing a substrate and coating the substrate with the composite as a cover layer above the substrate.

10. The method of claim 8, wherein providing the at least two materials includes providing a plurality of the at least two materials which refer to or include different chemicals, and further including combining different chemical components as pigments for the composite.

11. The method of claim 8, wherein at least one of said at least two materials refers to or includes metal oxide particles, the metal oxide particles to manifest the particular color.

12. The method of claim 8, wherein the at least two materials refers to or includes dyes of selected concentration to manifest the particular color.

13. The method of claim 8, wherein at least one of said at least two materials refers to or includes dielectric particles to manifest the particular color.

14. The method of claim 8, wherein at least one of said at least two materials refers to or includes dielectric and conductive particles to manifest the particular color.

15. The method of claim 8, wherein at least one of said at least two materials refers to or includes a synthetic material, composed of polymer or plastic, to manifest the particular color.

16. The method of claim 8, wherein a plurality of the at least two materials refer to or include two or more from the following: different chemicals to manifest the particular color, metal oxide particles to manifest the particular color, and dyes of selected concentration to manifest the particular color.

17. The method of claim 8, wherein a plurality of the at least two materials refer to or include two or more from the following: different chemicals to manifest the particular color, metal oxide particles to manifest the particular color, dielectric particles to manifest the particular color, synthetic material, and dyes of selected concentration to manifest the particular color.

18. The method of claim 8, wherein at least one of the two materials refers to or includes organic molecules, the organic molecules to manifest the particular color.

19. The method of claim 8, wherein the at least two materials are used in a set of at least two layers that are secured to one another to manifest the particular color.

20. The method of claim 8, wherein the at least two materials are integrated together to form the composite.

* * * * *